Figure 4:
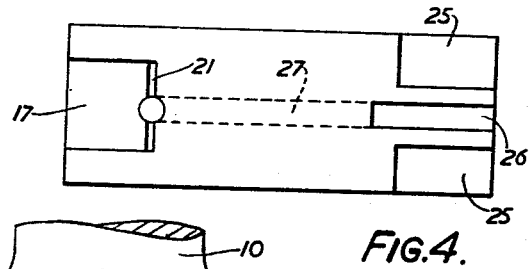

June 14, 1960 P. P. LOVE 2,940,802
JOURNAL BEARINGS
Filed Jan. 20, 1958

INVENTOR
PHIL P. LOVE

BY Pierce, Scheffler & Parker
his ATTORNEYS

United States Patent Office 2,940,802
Patented June 14, 1960

2,940,802

JOURNAL BEARINGS

Phil Prince Love, Wembley, England, assignor to The Glacier Metal Company Limited, Wembley, England, a British company Filed Jan. 20, 1958, Ser. No. 709,831

Claims priority, application Great Britain July 31, 1957

4 Claims. (Cl. 308—122)

This invention relates to journal bearings and primarily plain bearings, intended for use in a machine in which the bearing is subject to repetitive cyclic loading at the same angular part of the bearing, for example as in main bearings or connecting rod bearings of reciprocating engines.

It is an object of the invention to provide effective lubrication at the most highly loaded part of the bearing and according to the invention the bearing is formed with an arcuate recess in its internal bearing surface extending over a limited part of the inner circumference of the bearing, and a step leading up to an arcuate land continuous with the main bearing surface, this step being positioned angularly in advance of the area of peak load on the bearing, with respect to the direction of rotation of the journal in the bearing.

The term "continuous" as used herein is to be understood to mean that the surface is of the same radius of curvature, and at the same radial distance from the axis of rotation, as the main cylindrical bearing surface.

A bearing according to the invention thus operates on a similar principle to that of a Rayleigh thrust bearing which consists of radial recesses, steps, and lands on an annular surface, and in which hydro dynamic pressure is induced in the oil film over the recess and step so that the film will be carried forward on to the heavily loaded land. In a journal bearing subject to recurring cyclic loading, peak loads may tend to squeeze out the oil film between the bearing and the journal at the loaded area and it is an object of the invention to provide effective means for reconstituting this oil film before the next peak load occurs.

According to a preferred feature of the invention the step is positioned at a point between 90° and 30° (measured at the axis of rotation) in advance of the area of peak load. Preferably the recess extends over an arc subtending an angle of between 20° and 50° at the axis of rotation.

According to another preferred feature a somewhat deeper transverse groove (i.e. parallel to the axis of rotation) is provided in advance of the recess. Preferably the transverse groove is of limited length, and stops short of the opposite end edges of the bearing (to avoid leakage of oil from opposite ends of the groove).

The transverse groove may communicate with an arcuate supply groove disposed substantially opposite diametrically to the recess, and so arranged that during the part of the rotary cycle when the peak load is applied the supply groove is placed in communication with an oil feed hole in the journal.

According to another preferred feature of the invention the part of the bearing surface diametrically opposite to the step (or in the region extending up to 20° on either side of this point) is recessed adjacent its edges, so as to facilitate escape of oil therefrom, and thus prevent the build up over such area of any substantial oil pressure tending to oppose the formation of the oil film in the recess and over the step.

Figure 1:
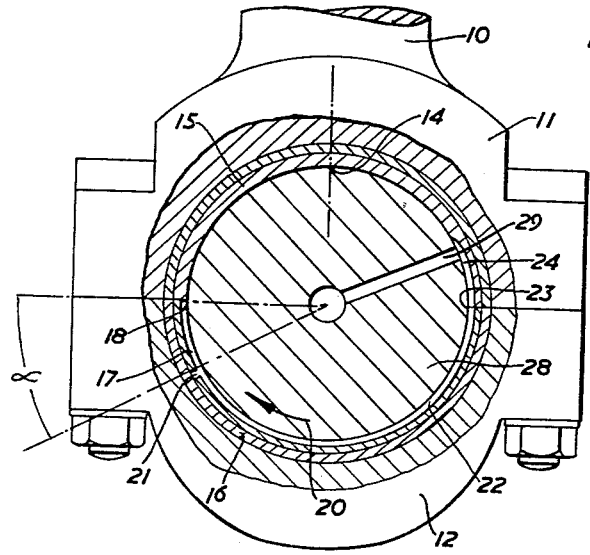
Figure 2:
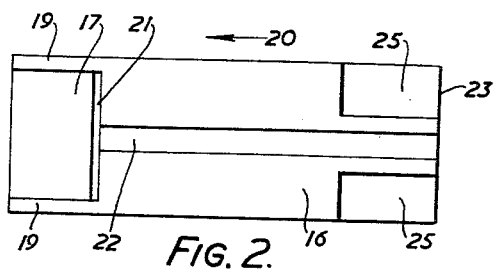
Figure 3:
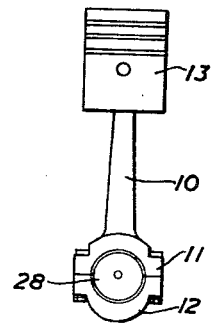

The invention may be performed in various different ways but one specific embodiment will now be described by way of example with reference to the accompanying drawings, in which:

Figure 1 is a side elevation partly in section of the big end bearing of a connecting rod of an internal combustion engine, Figure 2 is a developed view of the lower half bearing liner, Figure 3 is a side elevation on a reduced scale of the complete connecting rod and piston assembly, and Figure 4 is a developed view of an alternative form of half bearing.

In this example where the invention is applied to a plain journal bearing acting as a connecting rod big end bearing, the connecting rod 10 is formed with the usual structure 11 forming the rod half bearing housing, and a cap 12 is bolted thereto. The opposite end of the connecting rod is connected to a piston 13. Thus peak loads on the bearing will occur in the region of the crown 14 of the rod half of the bearing.

The bearing includes two semi-cylindrical bearing half liners 15, 16, clamped between the units 11 and 12. An arcuate recess 17 is formed in the bearing surface of the half liner 16, leading up to an abrupt step 18 which is positioned at a point between 90° and 30° in advance of the area of peak load in the region of the crown 14 of the rod half bearing. Thus conveniently the step 18 is positioned as illustrated at the joint edge of the rod half 15 of the bearing where it butts against the cap half 16. The recess 17 extends over an arc subtending an angle $\alpha$ of between 20° and 50° at the axis, and in the present case where the step 18 is located at the joint between the half liners, it is formed in the cap half 16 of the bearing, and is of limited length in a transverse direction parallel to the axis of rotation. The raised portions 19 at opposite sides of the recess thus tend to prevent escape of oil from opposite sides of the recess.

Immediately preceding the recess 17 (in relation to the direction of rotation of the crank pin within the bearing, as illustrated by the arrow 20 in Figures 2 and 3) there is provided a transverse groove 21 of approximately twice the depth of the recess, and of limited arcuate length. This groove communicates with an arcuate feeder groove 22 which is of limited transverse width, but extends circumferentially to the opposite butting edge 23 of the cap half of the bearing and may be continued at 24 into the adjacent part of the rod half 15 of the bearing.

The crank pin 28 will be provided with a radial oil supply passage 29 arranged to start delivering oil under pressure to the feeder groove 22 shortly before the moment when the peak load is occurring at the crown 14 of the rod half of the bearing, and this oil pressure will be communicated through the feeder groove 22 and transverse groove 21 to the recess 17, from which the oil will be induced to build up a film over the step 18.

The part of the bearing diametrically opposite to the step 18, that is to say in the present case the parts of the rod half and cap half bearings 15 and 16, may be recessed or relieved adjacent their sides, as at 25, to facilitate the escape of oil therefrom so as to prevent any pressure building up at this point which would counteract the oil film in the neighbourhood of the recess 17 and step 18. As illustrated the relief of the bearing at this point is preferably in the form of a pair of shallow recesses 25 whose arcuate length subtends an angle of between 10° and 80° at the axis of rotation, and lying on opposite sides of the feeder groove 22 but separate therefrom so as to prevent loss of oil pressure from the feeder groove. In a bearing having a three inch diameter the depth of these relieving recesses should be at least .010 inch.

In the modified cap half bearing liner illustrated in

Figure 4, as an alternative to the feeder groove 22 described above, oil is supplied to the transverse groove 21 and hence to the recess 17 by way of a short length circumferential slot 26 formed in the bearing at a point opposite to the step 18 and communicating with the transverse groove 21 via a passage 27 formed between a circumferential groove in the back or outer surface of the cap half of the bearing and the adjacent face of the cap 12 itself. In this arrangement also the oil will start to be supplied under pressure to the short supply slot 26 at the appropriate moment before the peak load occurs in the region of the crown 14, by means of a radial oil supply passage 29 in the crank pin 28.

The depth of the step 18 will in general be related to the diameter and width of the bearing. Irrespective of dimensions however and for practical reasons the minimum depth of the step will not be less than .001 inch. The preferred limits are as follows:

$$\text{Minimum depth of step} = \sqrt{\frac{\text{Diameter} \times \text{Width}}{1000}}$$

$$\text{Maximum depth of step} = 8\sqrt{\frac{\text{Diameter} \times \text{Width}}{1000}}$$

What I claim as my invention and desire to secure by Letters Patent is:

1. A journal and journal bearing assembly in which the bearing is formed with an arcuate recess in its main bearing surface extending over an arc subtending an angle between 20° and 50° at the axis of rotation, the minimum depth of the recess being $$\sqrt{\frac{\text{Diameter} \times \text{Width}}{1000}}$$

and the maximum depth being $$\text{eight times} \sqrt{\frac{\text{Diameter} \times \text{Width}}{1000}}$$

a somewhat deeper transverse groove coextensive with and communicating with the leading edge of the recess and parallel to the axis of rotation, and a step leading up from this recess to an arcuate land continuous with the main bearing surface, this step extending completely across the trailing edge of the recess and being positioned angularly in advance of the area of peak load on the bearing with respect to the direction of rotation of the journal in the bearing, said recess and groove both stopping short of the opposite end edges of the bearing.

2. A journal bearing as claimed in claim 1 in which the part of the bearing surface in the region extending up to 20° on either side of a point diametrically opposite to the step is relieved, so as to facilitate escape of oil therefrom, and thus prevent the build up over such area of any substantial oil pressure tending to oppose the formation of the oil film in the recess and over the step.

3. A journal and bearing assembly as claimed in claim 1 in which the step is positioned at a point between 90° and 30° measured at the axis of rotation in advance of the area of peak load.

4. A journal bearing as claimed in claim 1 in which the transverse groove communicates with an arcuate supply groove disposed substantially opposite diametrically to the recess, and so arranged that during the part of the rotary cycle shortly before and whilst the peak load is applied, the supply groove is placed in communication with an oil feed hole in the journal.

References Cited in the file of this patent

UNITED STATES PATENTS

| | | |
|---|---|---|
| 692,982 | Capewell | Feb. 11, 1902 |
| 1,947,023 | Shoemaker | Feb. 13, 1934 |
| 2,631,905 | Coppen | Mar. 17, 1953 |

FOREIGN PATENTS

| | | |
|---|---|---|
| 71,289 | Sweden | Feb. 5, 1929 |
| 200,229 | Australia | Nov. 23, 1955 |

OTHER REFERENCES

"Bearings and Their Lubrication," published by American Machinist in 1911, pages 100–102 relied upon.